DIODE-COUPLED SEMICONDUCTIVE MEMORY

Filed Aug. 27, 1968 4 Sheets-Sheet 1

INVENTORS
J. D. HEIGHTLEY
D. J. LYNES
W. C. SLEMMER
BY David P. Kelley
ATTORNEY

DIODE-COUPLED SEMICONDUCTIVE MEMORY

Filed Aug. 27, 1968 4 Sheets-Sheet 2

DIODE-COUPLED SEMICONDUCTIVE MEMORY

Filed Aug. 27, 1968 4 Sheets-Sheet 3

United States Patent Office 3,540,010

Patented Nov. 10, 1970

3,540,010

DIODE-COUPLED SEMICONDUCTIVE MEMORY

John D. Heightley, Basking Ridge, Dennis J. Lynes, Madison, and William C. Slemmer, Chatham, N.J., assignors to Bell Telephone Laboratories, Incorporated, Murray Hill and Berkeley Heights, N.J., a corporation of New York

Filed Aug. 27, 1968, Ser. No. 755,590

Int. Cl. G11c *11/36*

U.S. Cl. 340—173 9 Claims

ABSTRACT OF THE DISCLOSURE

A semiconductive memory system characterized in that simple storage cells are coupled through diodes to the information lines. The invention is advantageously employed in a memory comprising semiconductive integrated circuit arrays.

BACKGROUND OF THE INVENTION

This invention relates to semiconductive memory systems.

As techniques for fabricating monolithic integrated circuits have advanced and integrated circuit costs have decreased, a growing interest in semiconductive memory systems has become evident, and a number of such systems have been proposed.

Several factors are inherent in the design of an optimum semiconductive memory system. There should be simple memory cells to minimize system cost. There should be a minium number of connections to each cell to reduce the most and complexity of interconnections and to reduce the number of conduction path crossovers. There should be low power dissipation per cell to minimize the electric power which must be supplied to the memory system and correspondingly to minimize the amount of thermal energy which must be dissipated by the memory system.

An inexpensive and integrable semiconductive memory system is disclosed in the copending application filed Feb. 7, 1967, Ser. No. 614,489, and assigned to the assignee hereof. Inasmuch as the invention disclosed therein has primary application to a word-organized memory system, a description of this form of memory system appears in order.

A word-organized memory includes an array of storage cells arranged in an array of rows and columns and interconnected by a first plurality of conduction paths called word lines, at least one of which is connected to each cell in a given row, and a second plurality of conduction paths called digit lines, at least one of which is connected to each cell in a given column. The status of a given cell is detected or changed by selectively sensing and/or energizing the word line or lines and digit line or lines which are connected to the cell.

The organization of the semiconductive memory disclosed in the copending application cited hereinabove is such that each row of memory cells is connected to a single word line and each column of cells is connected to a pair of digit lines. Each memory cell has only three terminal connections, and these are in turn connected to the word line and to the digit lines. In addition to use in the writing and the reading processes, the word lines and the digit lines also serve to provide the operating power for each cell. The simplicity of this system is apparent.

Two disadvantages for some applications of the above-described system are that a DC current must flow on the digit lines to provide stand-by operating power for the cells and that the amplitudes of the reading and the writing signals are dependent on the stand-by power required by the cells. More specifically, DC current on the digit lines is a disadvantage because it increases the complexity of the detection circuitry associated with those lines. The amplitudes of the reading and the writing signals are dependent upon the stand-by power levels because the reading and the writing signals must flow through the same resistance circuitry through which the stand-by current flows.

A form of word-organized semiconductive memory system which at least partially eliminates the DC current on the digit lines is disclosed in Electronics, Feb. 20, 1967, pp. 143–154. The basic storage cells therein comprise simple flip-flops including double emitter transistors. Inasmuch as one of the emitters of each transistor is connected to a power supply return path and the other emitter of each transistor is connected to a digit line, no DC power supply current need flow on the digit lines. However, this system retains the disadvantage that the amplitudes of the reading and the writing signals are dependent upon stand-by power levels and incurs additional disadvantages attendant upon the increase in complexity of the basic cell.

An object of this invention is an inexpensive integrable semiconductive memory system comprising simple memory cells having low stand-by power dissipation.

A further object of this invention is a semiconductive memory system in which DC current on digit lines is either minimized or eliminated.

A further object of this invention is a semiconductive memory system in which the amplitudes of the reading and the writing signals are substantially independent of a low stand-by power required by each cell.

SUMMARY OF THE INVENTION

This invention will be described particularly with reference to a word-organized memory for which the invention has primary application. However, by appropriate changes to the individual cells particularly to include an "AND" function, the principles of the invention can be extended to a bit-organized memory.

In contradistinction to prior art systems, each cell according to this invention is connected through a coupling means to one or more digit lines associated with that cell. The coupling means is characterized by a capability of electrically isolating the cell from the digit lines during stand-by periods so that there need be no DC current flowing in the digit lines. The coupling means is further characterized by a capability of conducting current from the digit lines into the cell during reading and writing operations such that the amplitudes of reading and writing signals are independent of stand-by power supplied to the cell.

The coupling means may be any of a variety of apparatus having the above-described properties; such as, for example, diodes, transistors, or circuits apparatus comprisig diodes, transistors, and/or other circuit elements.

In an advantageous embodiment of this invention, a basic memory cell comprises a flip-flop including a pair of junction transistors, the base terminal of each being connected directly to the collector terminal of the other, the collector terminal of each being connected through separate load resistances to a common source of electric power, and the emitter terminal of each being connected to the emitter terminal of the other and to a common word line terminal. The collector terminal of each transistor is connected through a separate diode to separate ones of two digit lines. Accordingly, each basic cell includes four terminals, one of which is connected to a source of power, one of which is connected to a word line, and two of which are coupled through diodes to a pair of digit lines. Advantageously, the entire flip-flop is constructed in a monolithic integrated circuit form.

Information is written into a cell by reducing the voltage on a selected word line and supplying a current to an associated digit line such that current flows through one of the coupling diodes into the cell and sets the flip-flop to a state appropriate to the digit to be stored therein.

Nondestructive readout is achieved by reducing the voltage on a selected word line and detecting the polarity of a voltage differential between the digit lines.

BRIEF DESCRIPTION OF THE DRAWING

The invention will be better understood from the following more detailed description taken in conjunction with the accompanying drawing, in which.

DETAILED DESCRIPTION

Figure 1:
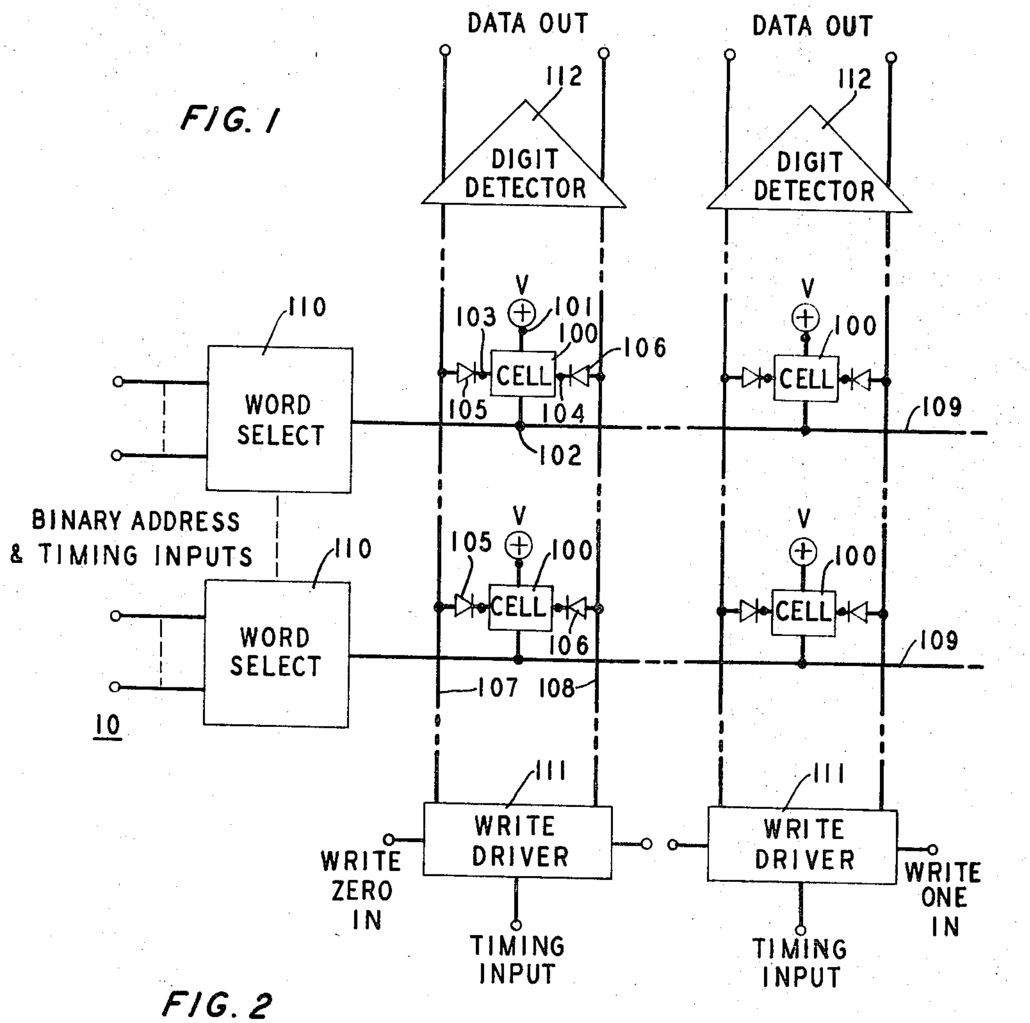
FIG. 1 shows in block circuit form a word-organized semiconductive memory in accordance with an advantageous form of the invention.

With reference now to the drawing, in FIG. 1 are shown the basic elements of the word-organized memory 10. A plurality of individual storage cells 100 are arranged in a two-dimensional array of rows and columns in conventional fashion. Each cell in essence is a flip-flop having two stable states between which it can be switched for the storage of binary digits. As seen, each cell is provided with four terminals, of which one, 101, is connected to a source of electric power, one, 102, is connected to an associated word line, and two, 103 and 104, are connected through coupling diodes, 105 and 106, to separate lines of an associated digit line pair, 107 and 108. Each word line is driven by a word select circuit 110, to which is supplied binary address and timing inputs in the usual fashion. Each pair of digit lines in turn is connected to its own writing circuit 111, to which are applied storage data and timing inputs in the usual fashion. Each pair of digit lines is further connected to its own digit detection circuit 112, to which timing inputs are applied and from which data is extracted in conventional fashion.

Write-in of a word to the cells associated with a particular word line is achieved by supplying a current from the digit line to one of the diodes connected to each cell while the word line is held at a reduced voltage level. For example, to write a word, binary address and timing inputs are applied to one of the word select circuits 110 such that the voltage on its particular word line is reduced. Then, information and timing inputs are applied to each write circuit 111 such that a current is supplied to an appropriate one of each digit line pair. Inasmuch as the selected word line is now at a lower voltage than are the other word lines, the digit line current flows into the appropriate cell and sets the flip-flop to a state appropriate to the digit to be stored therein. After the flip-flops are set, the selected word line is returned to the higher stand-by voltage. At stand-by, word line and digit line voltage levels are such that the coupling diodes 105 and 106 are reverse-biased. This reverse-biasing electrically isolates a particular cell from the digit lines at all times except when the status of the cell is being detected or changed.

For nondestructive readout of a stored word, the word line voltage is again reduced, and timing inputs are applied to each digit detection circuit 112. The reduced word line voltage is in such relation to other voltages in the system that the coupling diodes 105 and 106 are associated with the selected cells tend to become forward-biased. However, only one of the transistors in each cell is turned "on" at a given time. The coupling diode associated with the "on" transistor will conduct current from the digit line into the collector of the "on" transistor. The current which flows from the digit line through the coupling diode is primarily a dynamic current, i.e., a current associated with discharging of parasitic capacitance of the digit line and the circuitry attached thereto. Little or no current is supplied by either the driver circuit 111 or the detection circuit 112 during a read cycle. The detection circuit 112 is a balanced detector which transforms the voltage differential caused by the unequal discharging of parasitic capacitance on the digit lines to a binary output.

Figure 2:
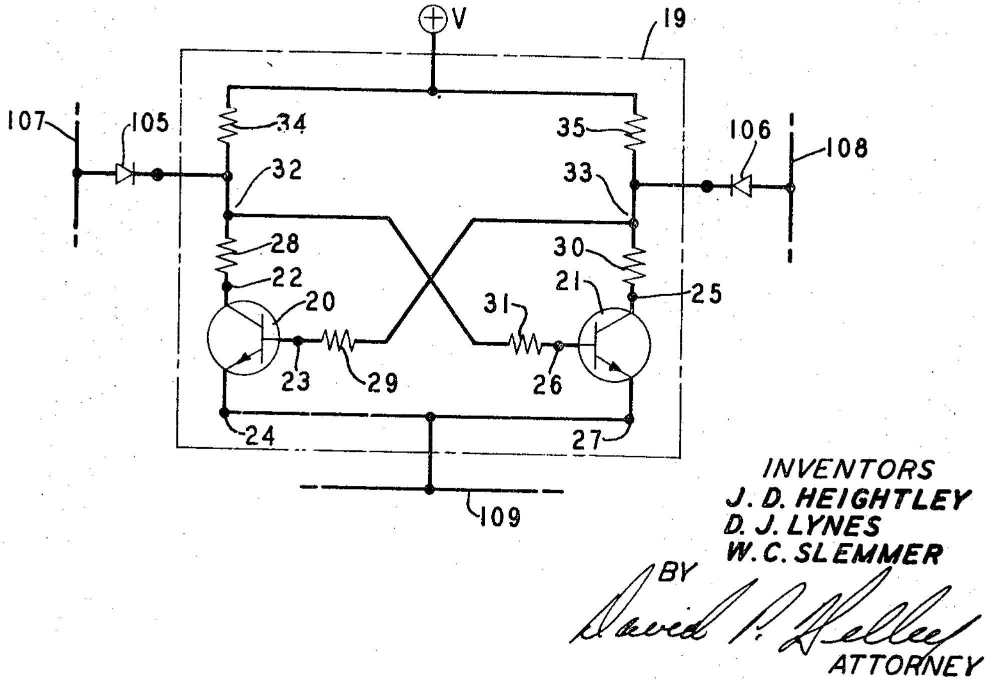
FIG. 2 shows a schematic diagram of a form of memory cell for use in the invention.

In FIG. 2 there is shown a flip-flop especially suited for use as the cell 100 in the memory shown in FIG. 1. More specifically, the circuitry inside the broken line 19 in FIG. 2 comprises the inner structure of the cell 100 in FIG. 1. The flip-flop comprises a pair of matched junction transistors 20 and 21, shown here illustratively of the NPN type, connected to form a flip-flop. To this end, the base 23 of transistor 20 is connected through a resistor 29 to a terminal 33 which is in turn connected through a resistor 30 to the collector 25 of transistor 21. The base 26 of transistor 21 is connected through a resistor 31 to a terminal 32 which is in turn connected to the collector of transistor 20. Terminal 32 is connected through load resistor 34 to a source of power (+V) and terminal 33 is connected through load resistor 35 to the same power source. The emitters 24 and 27 of transistors 20 and 21 are connected to a common word line 109. A pair of digit lines 107 and 108 are connected through diodes 105 and 106, respectively, to terminals 32 and 33, respectively.

To exemplify writing into cell 100, assume transistor 20 is "on," and it is desired to switch transistor 21 "on" and transistor 20 "off." The word line 109 is first reduced from stand-by voltage, e.g., 1.0 volt, to a lower voltage, e.g., 0.2 volt. Digit line 107 is supplied with a current which flows through diode 105, into terminal 32. inasmuch as transistor 20 is "on," this current initially flows through resistor 28 and into the collector 22 of transistor 20. This additional current through resistor 28 increases the voltage over resistor 28, and current quickly begins to divide and flow through resistor 31 into the base 26 of transistor 21, thus tending to turn transistor 21 "on." In the regenerative manner characteristic of flip-flops, once current commences flowing into the base of transistor 21, its collector voltage and consequently the base voltage of transistor 20 is lowered, and transistor 20 switches "off." When the switch is completed, current is removed from digit line 107, and word line 109 may be returned to stand-by voltage, or a read operation may be commenced without first returning the word line voltage to stand-by.

The regenerative action in cell 100 could be obtained without the presence of resistors 28, 29, 30, and 31, but their presence eliminates the dependence of cell operation on the gain of transistors 20 and 21. These resistors may be eliminated if this advantageous feature is not desired. However, resistors 28 and 30 may be typically 200 ohms, and resistors 29 and 31 may be typically 300 ohms. Inasmuch as these magnitudes of resistance are usually incurred as parasitic collector series resistance and base series resistance of a transistor within a monolithic integrated circuit, they may be tailored to produce the above-described advantageous result without increase in either cell complexity or cost.

Typical voltages in the cell may include a power supply voltage (+V) of about 1.8 volts, a stand-by voltage on digit lines 107 and 108 of about 1.1 volts, and a stand-by voltage on word line 109 of about 1.0 volt. Under these voltage relationships, diodes 105 and 106 will be reverse-biased, i.e., nonconducting, at stand-by. This feature enables the elimination of DC current from the digit lines at stand-by.

During reading and writing operations, the voltage relations are changed such that one or both diodes 105 and 106 become forward-biased and additional current flows from one or both digit lines 107 and 108 into the cell. This feature of bringing additional current into the cell during reading and writing operations achieves the object of having the amplitudes of reading and writing signals independent of stand-up power dissipation.

It will be apparent from FIG. 2 that for a particular power supply voltage (+V) and for a particular stand-by voltage on the word line 109, resistors 34 and 35, e.g., 20,000 ohms, determine the power dissipation of the cell during stand-by. Inasmuch as the dynamic currents, i.e., reading and writing, do not flow through resistors 34 and 35, stand-by power dissipation may be designed to be as low as desired without affecting the dynamic characteristics of the cell. In integrated circuit form, however, there may be an upper limit on the value of resistors 34 and 35 in order to minimize the physical size of the circuit.

For nondestructive readout of data from the cell in FIG. 2, the voltage on word line 109 is reduced below its stand-by value, and the voltage difference between digit lines 107 and 108 is sensed. If transistor 21 is "on," a parasitic capacitance discharge current flows from digit line 108, through diode 106, and into the collector of transistor 21, and there will be little or no discharge of the parasitics associated with digit line 107. Conversely, if transistor 20 is "on," the larger current will flow from digit line 107. After readout is complete, the word line voltage may be returned to its stand-by level, or there may be a successive write operation into the cell without first restoring the word line voltage to stand-by.

Figure 3:
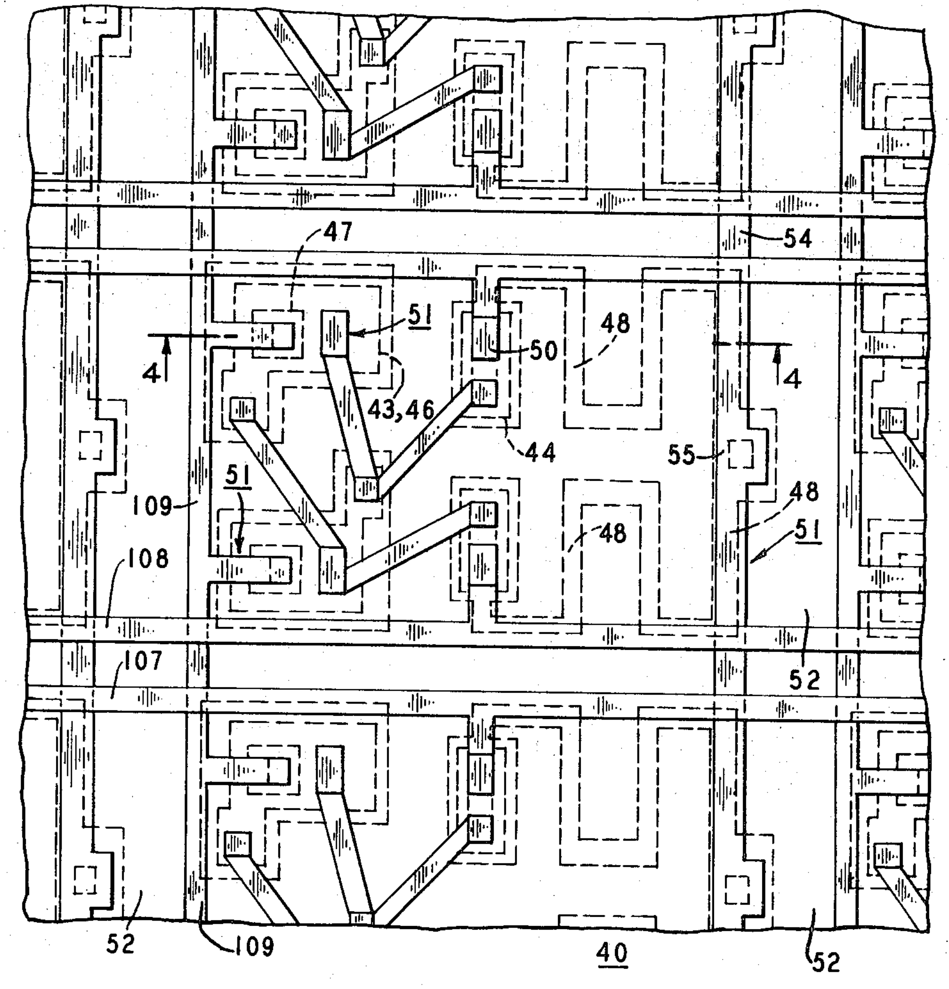
FIGS. 3 and 4 shows plan and sectional views, respectively, of a portion of the integrated monolithic circuit comprising an array of memory cells of the kind shown in FIG. 2.
Figure 4:
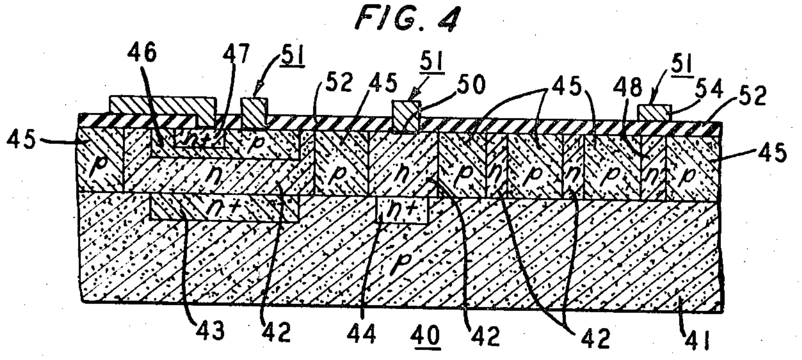

An important advantage of the memory which has been described is that the simplicity of the unit cell 100 readily permits fabrication of at least the basic cell array in monolithic integrated circuit form. With reference now to FIGS. 3 and 4, there is shown by way of example a plan and sectional view, respectively, of a monolithic integrated circuit showing a discrete cell.

In the manner known for the fabrication of monolithic integrated circuits, the array of cells is formed in a monocrystalline slice 40. The cell comprises original substrate material 41 of P-type conductivity and a relatively thin epitaxial layer 42 of N-type grown thereover. Before growth of the epitaxial layer, the P-type substrate is diffused selectively to form the localized N+-type regions 43 and 44 which serve as the connections and part of the collector regions of the NPN transistors. After growth of the epitaxial layer, a localized deep diffusion forms the P-type regions 45 which penetrate completely the epitaxial layer to the substrate material to provide electrical isolation where necessary. This is followed by a localized diffusion to form the P-type base zones 46 of the transistors. This is followed in turn by a localized diffusion to form the N+-type emitter zones 47. Each of the load resistors 34 and 35 is provided by the sheet resistance of the epitaxial N-type layer 42 and appears as the meander patterns 48, in FIG. 3. Base and collector resistors 28, 29, 30, and 31, as described hereinabove, are provided by appropriate design to utilize the parasitic series resistances within the transistors. Coupling diodes 105 and 106 are provided as Schottky barrier diodes 50 formed between metallic contacts and the epitaxial layer. A method of forming Schottky barrier diodes suitable for this application is described in the copending patent application, filed Nov. 15, 1967, Ser. No. 683,238, and assigned to the assignee hereof. Although Schottky barrier diodes are included in this illustration, it will be understood that PN junction diodes may be used instead.

The desired interconnections are achieved by metallic layers 51 overlying an insulating layer 52 in the usual fashion. Advantageously, the metallic interconnections may be composite layers including platinum and gold, e.g., as described in United States Pat. 3,335,338 and 3,426,252, both to M. P. Lepselter and assigned to the assignee hereof. The insulating layer, for example, may be of aluminum oxide, silicon oxide, silicon nitride, or a composite thereof.

As shown, the word lines 109 run vertically across the slice making electrical connection to the emitter 47 of each transistor. The digit lines 107 and 108 run horizontally, as shown, and make electrical connection to the cell at the anode side of each of the Schottky barrier diodes 50. Power supply line 54 is shown running vertically at the right of FIG. 3 and at the right in FIG. 4. Supply line 54 makes electrical contact to the meander resistors 48 at position 55, shown in FIG. 3 only.

The digit lines 107 and 108 must cross over the word lines and power supply lines without making electrical connection thereto. To facilitate the crossover, an N+-type diffused crossunder may be used such as described, for closed in example, in U.S. Pat. 3,295,031, issued Dec. 27, 1966. Alternatively, a particularly advantageous form of crossover is the air-insulated beam lead crossover disclosed in U.S. Pat. No. 3,461,523, issued Aug. 19, 1969, and assigned to the assignee hereof.

It should be apparent that a variety of flip-flops can be used in the practice of this invention. For example, the NPN junction transistors could be replaced by PNP junction transistors or by field effect transistors in a stratghtforward manner. The word select circuit and reading and writing circuit can take a variety of forms. However, for purposes of illustration, there will be described exemplary forms of such circuits.

Figure 5:
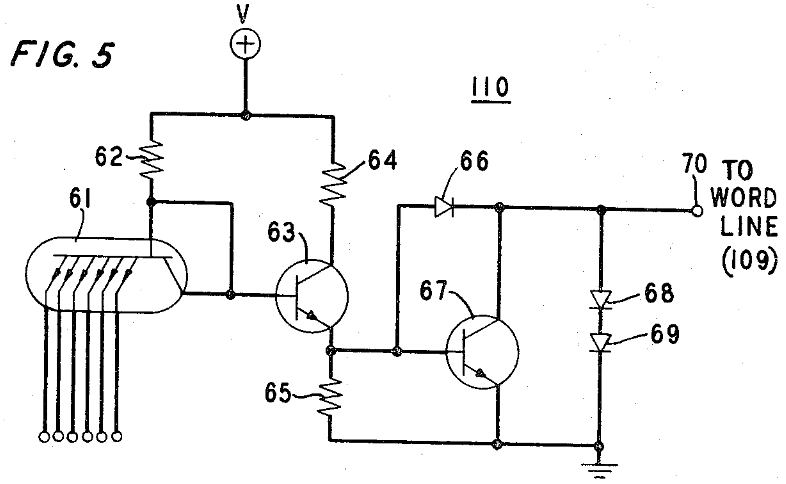
FIG. 5 shows a schematic diagram of a word select circuit for use in the memory of FIG. 1.

In FIG. 5, there is shown a circuit schematic of one form of word select circuit 110 that can be used in the memory described hereinabove.

Circuit 110 comprises an NPN junction transistor 61 having multiple emitters, one for each digit of the input binary address. For a sixty-four-word system corresponding to a six-bit binary address, six emitters are included. The base of transistor 61 is connected by way of resistor 62 to the positive terminal of the source of electric power (+V). The base of transistor 61 is also connected to the collector of transistor 61 and to the base of another NPN transistor 63. The collector of transistor 63 is connected by way of resistor 64 to the power source (+V), and the emitter of transistor 63 is connected by way of resistor 65 to an electrical ground. The emitter of transistor 63 is also connected to the base of a third NPN transistor 67 whose base is connected by way of a diode 66 to its collector to prevent excessive saturation of transistor 67 in operation. The emitter of transistor 67 is connected directly to ground, and the collector 70 of transistor 67 is connected by way of two diodes 68 and 69 in series to ground. Collector 70 is the output of word select circuit 110, and, as such, connected directly to a word line 109.

In operation, transistor 61 serves as an "AND" gate, and in the absence of the appropriate addressing voltage to its input emitters, it is conducting, with the result that transistor 63 is nonconducting and transistor 67 is nonconducting. Hence, the stand-by current flowing in the word line can flow only through the diodes 68 and 69 to ground. If, for example, diodes 68 and 69 are Schottky barrier diodes comprising platinum-silicide on N-type silicon as described in the copending application mentioned hereinabove, the voltage over each conducting diode will be about 0.5 volt, and so, terminal 70 (and the word line to which it is attached) will be about 1.0 volt.

When the appropriate addressing signals are applied to the "AND" gate 61 and it is turned "off," current flows through resistor 62 turning transistor 63 "on." The emitter current from transistor 63 divides between resistor 65 and transistor 67 with the result that transistor 67 turns "on,' and transistor 67 becomes a low impedance sink for the word line current. As a result, the voltage of terminal 70 decreases to the saturation voltage of transistor 67, e.g., about 0.2 volt.

Thus, as an example, it has been set forth that at stand-by the word line voltage is about 1.0 volt and that during dynamic periods, e.g., reading and writing, the word line voltage is reduced to about 0.2 volt.

Figure 6:
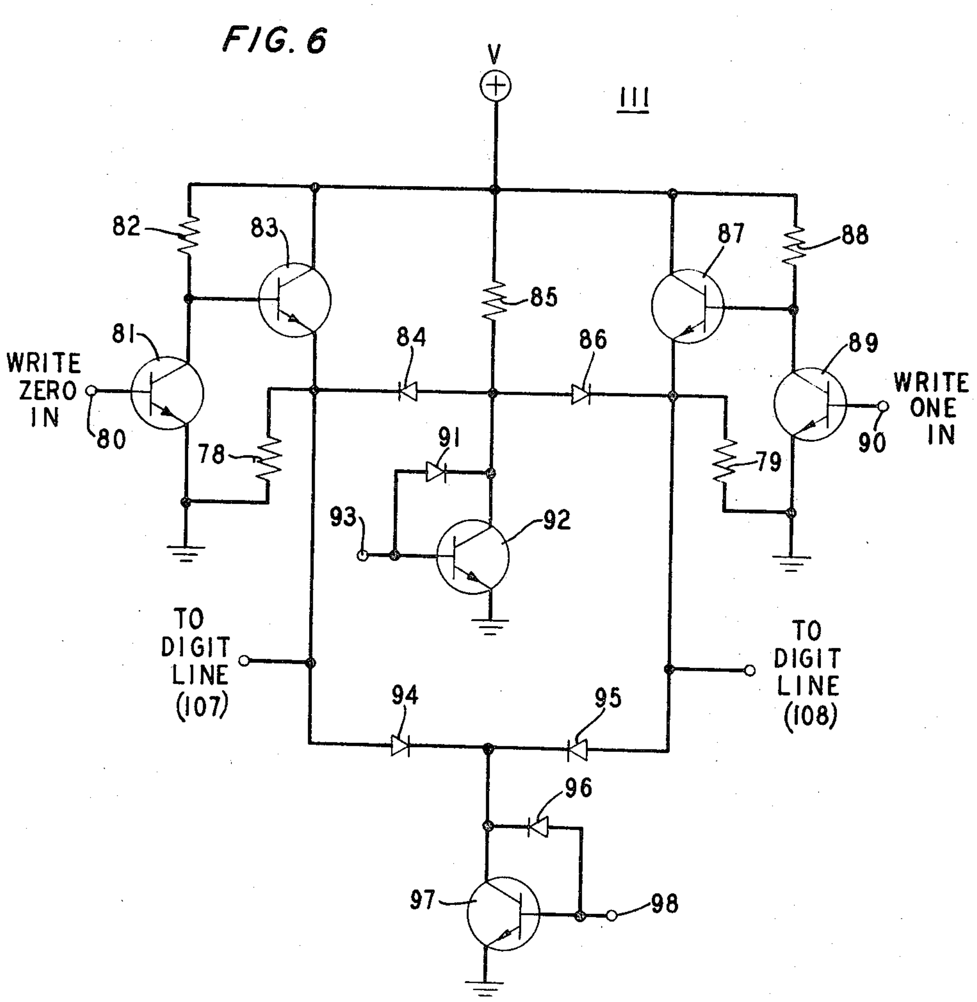
FIG. 6 shows a schematic diagram of a digit write circuit for use in the memory of FIG. 1.

With reference now to FIG. 6, there is shown one form of digit line driving circuit 111 for use in the memory of FIG. 1. The terminal associated with digit line 107 is connected to the emitter of an NPN transistor 83, to the cathode of a diode 84, to the anode of a diode 94, and to a resistor 78 whose other terminal is connected to ground. The cathode of diode 94 is connected to the cathode of a diode 95 and to the collector of an NPN transistor 97 whose emitter is connected to ground and whose base terminal 98 is an input terminal of circuit 111 and is connected by way of an antisaturation diode 96 to its collector. The terminal associated with digit line 108 is connected to the anode of diode 95, to the cathode of another diode 86, to the emitter of another NPN transistor 87, and to a resistor 79 whose other terminal is connected to ground. The anodes of diodes 84 and 86 are connected together and are connected through a resistor 85 to a source (+V) of electric power. The anodes of diodes 84 and 86 are also connected to the collector of another NPN transistor 92 whose emitter is connected to ground and whose base terminal 93 is an input terminal of circuit 111 and is connected by way of an antisaturation diode 91 to its collector. The base of previously mentioned transistor 83 is connected through a resistor 82 to the collector of transistor 83, which collector is in turn connected to the power source. The base of transistor 83 is also connected to the collector of another NPN transistor 81 whose emitter is connected to ground and whose base terminal 80 is an input for the circuit 111. The base of previously mentioned transistor 87 is connected through a resistor 88 to the collector of transistor 87, which collector is in turn connected to the power source. The base of transistor 87 is also connected to the collector of another NPN transistor 89 whose emitter is connected to ground and whose base terminal 90 is an input terminal for the circuit 111.

During stand-by periods, input terminals 80 and 90 are held at about 0.7 volt so that transistors 81 and 89 are "on," and transistors 83 and 87 are "off." Input terminals 93 and 98 are held near ground so that transistors 92 and 97 are "off." A small current flows through resistor 85, divides through diodes 84 and 86, and flows through resistors 78 and 79 to ground. In proper relation, this current establishes a voltage of about 1.1 volts at the terminals associated with digit lines 107 and 108.

During a read cycle, transistor 92 is gated "on" by applying a voltage of about 0.7 volt to terminal 93. With transistor 92 "on," diodes 84 and 86 become reverse-biased, and circuit 111 presents a relatively high impedance to digit lines 107 and 108.

During a write cycle, digit line driving circuit 111 provides current to one of the digit lines for writing a digit into a cell. More specifically, when writing current is required on digit line 107, transistor 92 is first gated "on" to reverse-bias diodes 84 and 86, as above. Then transistor 81 is turned "off" by pulling terminal 80 near to ground voltage. This turns "on" transistor 83 which drives emitter current onto digit line 107. Similarly, when writing current is required on digit line 108, transistor 89 is gated "off," and transistor 87 drives emitter current onto digit line 108.

Diodes 94, 95, 96, and transistor 97 are provided as a means for balancing the digit lines after a write cycle. More specifically, immediately after a write cycle, digit lines 107 and 108 are usually not at the same voltage, i.e., they are unbalanced. To balance these lines, transistor 92 is first gated "off" by returning terminal 93 to near ground voltage. Then transistor 97 is gated "on" by applying a voltage of about 0.7 volt to terminal 98. In the "on" state, transistor 97 is a low impedance current sink for the rest of circuit 111 and for the digit lines. Both digit lines are balanced to a voltage of one transistor saturation voltage plus one diode drop, e.g., about 0.7 volt when the diodes are Schottky barrier of the type described hereinabove. Then, transistor 97 is gated "off," and the balanced digit lines rise together to the stand-by voltage which, for this example, is about 1.1 volts, as recited hereinabove.

Figure 7:
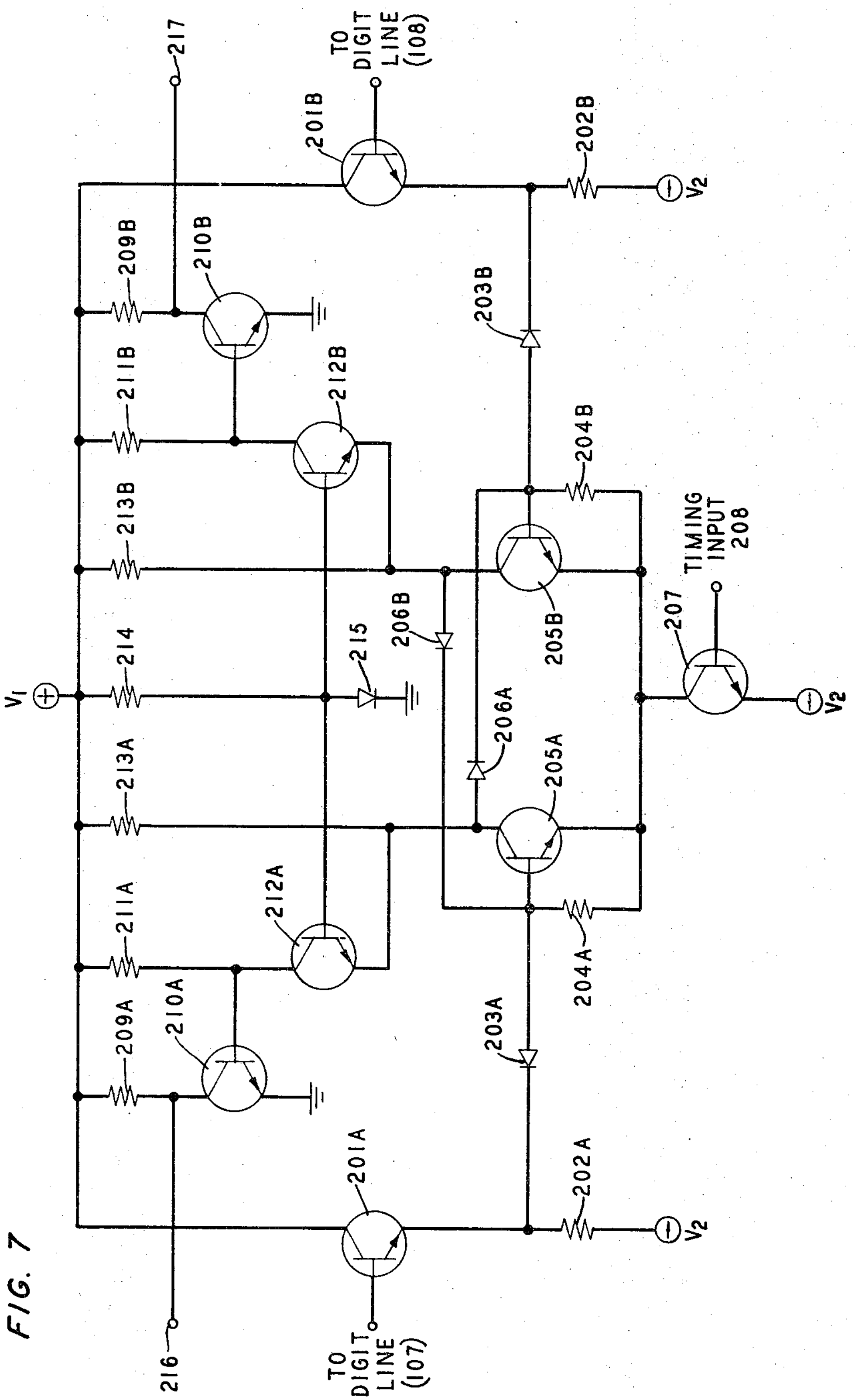
FIG. 7 shows a schematic diagram of a digit detection circuit for use in the memory of FIG. 1.

With reference now to FIG. 7, there is shown one form of digit detection circuit 112 for use in the memory of FIG. 1. Circuit 112 is similar in part to the diode coupled balanced digital detector disclosed in U.S. Pat. No. 3,380,-800, issued Nov. 25, 1969, to D. J. Lynes et al., and assigned to the assignee hereof. Inasmuch as circuit 112 is a balanced circuit and is therefor symmetric about a center line, it will be convenient to use the suffixes A and B to the reference numerals to designate corresponding elements in the two halves of the circuit.

In particular, the terminal associated with digit line 107 is connected to the base of an emitter follower NPN transistor 201A, and the terminal associated with digit line 108 is connected to the base of another emitter follower NPN transistor 201B. The collector of transistor 201A is connected to the positive termial $(+V_1)$ of a source of electric power, and the collector of transistor 201B is connected to the same positive power source. The emitter of transistor 201A is connected through a biasing resistor 202A to the negative terminal $(-V_2)$ of a source of electric power, and the emitter of transistor 201B is connected through its bias resistor 202B to the same source $(-V_2)$ of power. Diodes 203A and 203B, having their cathodes connected to the emitters of transistors 101A and 201B, respectively, and their anodes connected to the bases of a matched pair of NPN transistors 205A and 205B, respectively, provide a low impedance means for coupling signals from the relatively high impedance emitter follower transistors 201A and 201B to transistors 205A and 205B. Transistors 205A and 205B are the basic elements of a diode couple flip-flop. Accordingly, the collector of transistor 205A is connected to the anode of a diode 206A whose cathode is connected to the base of transistor 205B, and the collector of transistor 205B is connected to the anode of a diode 206B whose cathode is connected to the base of transistor 205A. The emitters of transistors 205A and 205B are connected together, and the bases of these transistors are connected to the emitters through a pair of matched bleeder resistors 204A and 204B. The emitters of transistors 205A and 205B are also connected to the collector of an enabling NPN transistor 207 whose emitter is connected to the negative power sources $(-V_2)$, and whose base terminal 208 is a timing input for the circuit 112. The collectors of transistors 205A and 205B each are connected through a load resistor 213A and 213B to the positive power source $(+V_1)$.

The remaining elements of circuit 112 provide an output means for reading data out of the flip-flop detector. To this end, a pair of NPN transistors 212A and 212B is provided with emitters connected to the collectors of the flip-flop transistors 205A and 205B, respectively, and with collectors connected through biasing resistors 211A and 211B to the positive power source $(+V_1)$. The collectors of transistors 212A and 212B are connected, respectively, to the bases of two additional NPN transistors 210A and 210B whose emitters are connected to ground. The collectors of transistors 210A and 210B each are connected through load resistors 209A and 209B to the positive power source $(+V_1)$. The collectors of transistors 210A and 210B are output terminals 216A and 216B, respectively, of the circuit 112. Finally, a bias resistor 214 is connected to the anode of a diode 215 whose cathode is connected to ground. The anode of diode 215 is also connected to the bases of previously recited transistors 212A and 212B.

In operation, diodes 203A and 203B are continually conducting to maintain a low impedance coupling between emitter follower inputs 201A and 201B and the balanced flip-flop detector transistors 205A and 205B. Diode 203A conducts current through the path comprising resistor 213B, diode 206B, diode 203A, and resistor 202A. Similarly, diode 203B conducts through the current path comprising resistor 213A, diode 206A, diode 203B, and resistor 202B.

The power supply levels, the circuit element values, and the timing input 208 voltage may be adjusted such that during stand-by periods the emitter follower input transistors 201A and 201B are "on," and the balanced detector transistors 205A and 205B are "off." Transistors 212A and 212B may be "off" with the result that transistors 210A and 210B are "on" and output terminals 216A and 216B are at a relatively low voltage, e.g., nearly ground. With a stand-by digit line voltage of about 1.1 volts as described hereinabove, power supply voltages of 3.5 volts for $(+V_1)$ and —2.0 volts for $(-V_2)$ have been used.

During a read cycle, as described hereinabove, the word line voltage is reduced. This causes one of the coupling diodes 105 or 106 in FIG. 1 to become forward-biased, and the voltage on the corresponding digit line 107 or 108 becomes less than the voltage on the other digit line. This voltage differential is coupled through the emitter follower inputs 201A and 201B of FIG. 7 and through the diodes 203A and 203B to the bases of detector transistors 205A and 205B. Then, transistor 207 is switched "on" by applying a signal to the timing input 208. When transistor 207 is "on," diodes 203A and 203B are reverse-biased, and the voltage differential on the bases of detector transistors 205A and 205B causes one of these transistors to switch "on" in the regenerative manner characteristic of flip-flops. For example, if transistor 205A is "on," transistor 205B is "off," and common base transistor 212A is "on." When transistor 212A is "on," its collector voltage is low, and transistor 210A is "off." Thus output terminal 216A is at a relatively high voltage while terminal 216B remains at the lower stand-by voltage. Correspondingly, if transistor 205B is "on," output terminal 216B is at a higher voltage than terminal 216A.

It is to be understood that the various arrangements described are merely descriptive of the general principles of the invention. In particular, various modificatons will be apparent to those in the art without departing from the spirit and scope of the invention. For example, a basic storage cell comprising field effect transistors rather than junction transistors obviously could be used instead.

Further, the principle of diode coupling to digit lines can be applied to storage cells comprising one or more multiple emitter junction transistors. In these combinations, the transistor emitters are advantageously connected to digit writing circuits and the transistor collectors are advantageously coupled through diodes to digit detection circuits. Particularly in monolithic integrated circuits, but in the more conventional discrete circuits as well, the above-described advantageous connections provide minimum parasitic loading on the digit lines.

Still further, a transistor or a transistor in series with a diode can be used for the coupling means in an embodiment for minimizing the word line current, thereby for minimizing the amount of current which a word select circuit must provide. More specifically, the anode terminal of the coupling diode is connected to the digit line, and the cathode terminal of the coupling diode is connected to the collector terminal of the coupling transistor whose emitter terminal is connected to the cell. The base terminal of the coupling transistor is connected to the word line. In this embodiment, the word line voltage is low at stand-by and is raised to turn "on" the coupling transistor during read operations and write operations. For this reason, the emitters of the flip-flop transistors are connected to ground rather than to the word line.

What is claimed is:

1. Apparatus for storing information comprising:
- a matrix of storage cells, each storage cell comprising a bistable circuit including a pair of cross-coupled transistors;
- means forming a first plurality of word line conduction paths, the cells in a given row of the matrix being connected to a common path of said plurality;
- means forming a plurality of pairs of digit line conduction paths; and
- a plurality of pairs of diodes, each of said storage cells being connected through a separate pair of said diodes to a pair of said plurality of digit line conduction paths in such a manner that the amplitudes of the reading and writing signals from and into said cells are essentially independent of standby power levels in the cells.

2. Apparatus as recited in claim 1 wherein the pairs of diodes are poled so that current flowing in the forward-biased direction through the diodes tends to turn on the cross-coupled transistor into whose base it flows.

3. Storage apparatus as recited in claim 1 further characterized in that the anode of each coupling diode is connected to the digit line and the cathode of each coupling diode is connected to a cell.

4. Storage apparatus as recited in claim 1 further characterized in that the anode of each coupling diode is connected to a digit line and the cathode of each coupling diode is connected to the base of a transistor within a cell through resistance means.

5. Storage apparatus as recited in claim 1 further characterized in that the diode includes only two terminals, one of which is connected to the cell, and the other of which is connected to the digit line.

6. Apparatus for storing information comprising:
- a matrix of bistable storage cells, each cell including a pair of cross-coupled transistors;
- means forming a first plurality of word line conduction paths;
- means forming a plurality of pairs of digit line conduction paths;
- said word line conduction paths and digit line conduction paths arranged in coordinate fashion such that there are defined a plurality of crossover points, associated with each of which there is a word line conduction path and a pair of digit line conduction paths; the storage cells being disposed such that each cell is located at one of said crossover points;
- means for connecting each of said cells to the word line with which it is associated;
- a pair of diodes associated with each cell, the cell being connected separately through the pair of diodes to the pair of digit line conduction paths with which the cell is associated;
- said diodes arranged such that the amplitudes of the reading and writing signals are essentially independend of standby power levels in the cells.

7. Apparatus as recited in claim 6 additionally comprising: a first plurality of circuit means each of which is connected to at least one of said word line conduction paths, and each of which includes means in response to a control signal for reducing the voltage on the word line conduction path to which it is connected sufficiently to cause a detectable amount of current to flow from at least one of said digit lines through at least one of said pair of coupling diodes into at least one of said cells.

8. Apparatus as recited in claim 7 additionally comprising a second plurality of circuit means, one of which is connected to each pair of said digit line conduction paths, and each of which includes means in response to a control signal for detecting the flow of currents caused by said first plurality of circuit means.

9. Apparatus as recited in claim 6 additionally comprising:

a first plurality of circuit means each of which is connected to at least one of said word line conduction paths, and each of which includes means in response to a control signal for reducing the voltage on the word line conduction path to which is connected; and a second plurality of circuit means, each of which is connected to at least one pair of said pairs of digit line conduction paths, and each of which includes means in response to a control signal for selectively energizing one conduction path of the pair of conduction paths to which it is connected sufficiently to cause the storing of a signal in the cell located at the crossover point at which the energized digit line intersects the word line having the reduced voltage;

so that information thereby is written into the cell via a current amplitude which is essentially independent of the standby current amplitudes within the cell.

References Cited

UNITED STATES PATENTS

| | | | |
|---|---|---|---|
| 2,939,969 | 6/1960 | Kwap ---------- | 307—247 X |
| 3,067,336 | 12/1962 | Eachus ---------- | 307—247 X |
| 3,177,374 | 4/1965 | Simonian. | |
| 3,218,613 | 11/1965 | Gribble. | |
| 3,354,440 | 11/1967 | Farber. | |
| 3,390,382 | 6/1968 | Igarashi. | |
| 3,421,026 | 1/1969 | Stopper. | |

OTHER REFERENCES

Agusta, Single 3-Dimensional Memory Cell, IBM Technical Disclosure Bulletin, vol. 8, No. 12, May 1966, pp. 1851–2.

TERRELL W. FEARS, Primary Examiner

U.S. Cl. X.R.

307—238, 292